A. RICKETTS.
JAM DOLLY.
APPLICATION FILED JULY 10, 1908.

922,514. Patented May 25, 1909.

Witnesses
Frank A. Fahle
Thomas W. McMeans

Inventor
Albert Ricketts,
By Bradford & Hood,
Attorneys.

UNITED STATES PATENT OFFICE.

ALBERT RICKETTS, OF INDIANAPOLIS, INDIANA.

JAM-DOLLY.

No. 922,514.     Specification of Letters Patent.     Patented May 25, 1909.

Application filed July 10, 1908. Serial No. 442,887.

*To all whom it may concern:*

Be it known that I, ALBERT RICKETTS, a citizen of the United States, residing at Indianapolis, in the county of Marion and State of Indiana, have invented certain new and useful Improvements in Jam-Dollies, of which the following is a specification.

In structural iron work, especially in the erection of buildings, bridges, etc., many rivets have to be placed in position on the work, and there are a great many places where it is exceedingly difficult to properly back up the rivet during the heading operation. It has heretofore been quite common to cut a bar of iron of just the right length to permit it to be crowded in under a rivet and extend from the rivet to an opposing portion of a beam or column. Such an instrument, however, is quite difficult to place and to hold in position and requires considerable time in its production as well as being rather inefficient in actual operation. Such an instrument is commonly known among structural iron workers as a "jam dolly".

The object of my present invention is therefore to produce a convenient and easily operated "jam dolly" the effective length of which may be readily adjusted and which may be easily placed in otherwise inaccessible positions and held therein in a firm manner during the heading operation on a rivet.

The accompanying drawings illustrate my invention.

Figure 1:
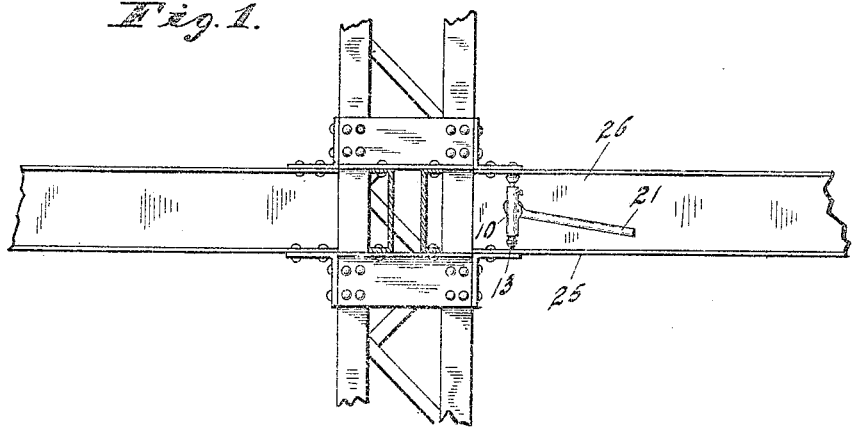
Figure 2:
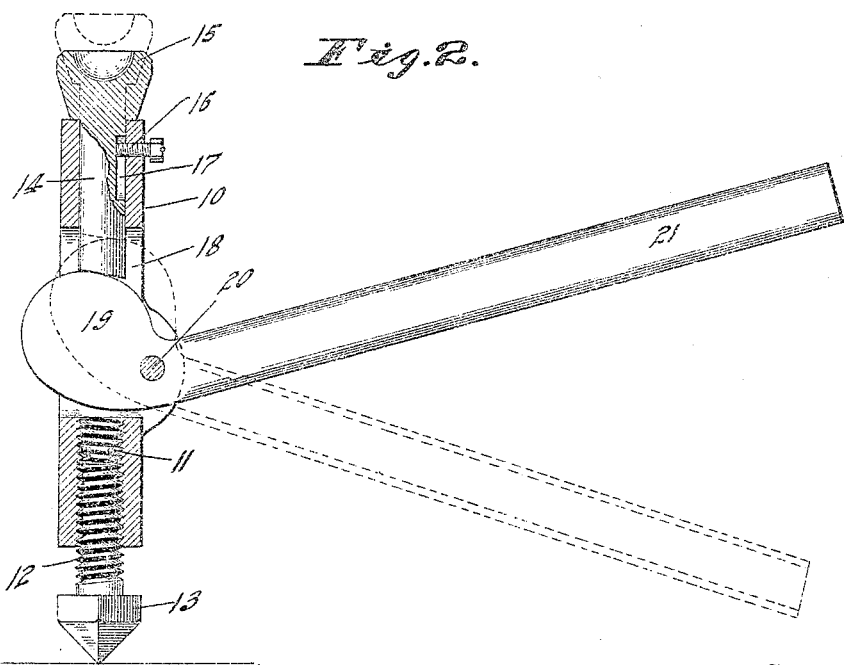

Figure 1 is a fragmentary detail of structural steel work with my improved "jam dolly" in operative position, and Fig. 2, a longitudinal sectional detail of my improved tool.

In the drawings 10 indicates the main body of the tool, said main body having at one end a threaded axial opening 11 adapted to receive the threaded stem 12 of a pointed foot member 13. The opposite end of body 10 is axially bored to receive the stem 14 of the rivet cup 15 said stem being held against turning in body 10 by means of a screw 16 projected into a longitudinal slot 17 formed in stem 14. Extending diametrically through body 10 medially thereof is a slot or passage 18 into which the inner end of stem 14 extends, and mounted in said slot 18 is a cam 19 pivoted at 20 to the main body and provided with an operating handle 21, the cam 19, engaging the inner end of stem 14 so as to drive the same outwardly to the position indicated in dotted lines in Fig. 2. Body 10 is made of any desired length, preferably of such length as to permit its introduction into the smallest space likely to be encountered, and stem 14 is of sufficient length to permit an extension to the dotted position, slightly in excess of the thickness of an average rivet head.

In use head 13 is adjusted relative to the body 10 until the effective length of the tool, when the parts are in the position shown in full lines of Fig. 2, is slightly less than the distance between a rivet head and an opposing flange or other portion 25 of the structural member 26 to be operated upon. The rivet is then introduced and held while the dolly is placed in position as shown in Fig. 1. A slight swing of the lever 21 thereupon projects the cup 15 into engagement with the rivet head and thus forms a firm backing or strut for the rivet during heading operation. It will be noticed that during the swinging of lever 21 there is no slipping of any part upon the structural member but that, instead, the pointed end of head 13 forms a positive footing for the tool during the time when the same is being extended into supporting position. It is therefore possible to accurately place the dolly practically in line with the rivet and maintain the same in that position during the time when it is being brought into operative condition. Consequently the dolly may be placed practically in line with the rivet and thus insure a proper and accurate support therefor so that it is not improperly distorted by the riveting operation.

I claim as my invention:

A jam dolly comprising a main hollow body having a transverse slot, a pointed foot member threaded into one end of said hollow body, a rivet cup axially movably mounted in the other end of said body, a cam pivotally mounted in the transverse slot upon an axis substantially at right angles to the axis of the main body and in engagement with the inner end of the rivet cup, and a lever connected to said cam for operating the same.

In witness whereof, I, have hereunto set my hand and seal at Indianapolis, Indiana, this thirtieth day of June, A. D. one thousand nine hundred and eight.

ALBERT RICKETTS. [L. S.]

Witnesses:
   CHESTER BRADFORD,
   THOMAS W. MCMEANS.